US007746510B2

(12) United States Patent
Pandipati

(10) Patent No.: US 7,746,510 B2
(45) Date of Patent: Jun. 29, 2010

(54) RECEIPTS SCANNER AND FINANCIAL ORGANIZER

(76) Inventor: Radha K. C. Pandipati, 19531 Desmet Pl., Montgomery Village, MD (US) 20886

( * ) Notice: Subject to any disclaimer, the term of this patent is extended or adjusted under 35 U.S.C. 154(b) by 2033 days.

(21) Appl. No.: 10/054,390

(22) Filed: Jan. 24, 2002

(65) Prior Publication Data

US 2002/0101626 A1 Aug. 1, 2002

Related U.S. Application Data

(60) Provisional application No. 60/265,406, filed on Feb. 1, 2001.

(51) Int. Cl.
*H04N 1/04* (2006.01)
(52) U.S. Cl. .............. 358/474; 358/1.15; 358/473; 358/501; 382/313; 235/380; 235/375
(58) Field of Classification Search ........... 358/474, 358/1.15, 505, 473, 1.5, 501; 235/380, 375; 382/313, 311
See application file for complete search history.

(56) References Cited

U.S. PATENT DOCUMENTS

| 5,091,968 | A | 2/1992 | Higgins et al. |
| 5,159,548 | A | 10/1992 | Caslavka |
| 5,604,640 | A | 2/1997 | Zipf et al. |
| 5,644,663 | A | 7/1997 | Saito et al. |
| 5,751,842 | A | 5/1998 | Riach et al. |
| 5,813,009 | A | 9/1998 | Johnson et al. |
| 5,897,625 | A | 4/1999 | Gustin et al. |
| 5,910,988 | A | 6/1999 | Ballard |
| 5,926,550 | A | 7/1999 | Davis |
| 5,963,925 | A | 10/1999 | Kolling et al. |
| 5,969,324 | A | 10/1999 | Reber et al. |
| 6,009,408 | A | 12/1999 | Buchanan |
| 6,029,144 | A | 2/2000 | Barrett et al. |
| 6,054,707 | A | 4/2000 | Hou |
| 6,064,779 | A * | 5/2000 | Neukermans et al. ....... 382/313 |
| 6,115,241 | A * | 9/2000 | Hu ............................ 361/683 |
| 6,192,165 | B1 | 2/2001 | Irons |
| 6,240,216 | B1 | 5/2001 | Nemoto et al. |

(Continued)

OTHER PUBLICATIONS

Marc Joye et al., "Secure Evaluation of Modular Functions" 2001 INT. Workshop on Cryptology and Network Security, Sep. 28, 2001.

*Primary Examiner*—Negussie Worku
(74) *Attorney, Agent, or Firm*—Mattingly & Malur, P.C.

(57) ABSTRACT

The system contains a scanner, an apparatus for scanning receipts into a computer and a unique software program which automatically processes, organizes and saves expense information that can be viewed in various formats, namely, tabular statements, pie-charts, etc. The scanner, which accommodates paper of differing sizes, is used to input bills, receipts, bank statements, etc. The scanner is usually connected to a computer through a Universal Serial Bus or a parallel port for easy installation. The software program creates a text file of the scanned data by inclusion of sorting, categories, etc., and automatically saves the information in Quicken Interchange Format, allowing it to be imported into any financial management software for further processing. Each receipt is treated as an individual transaction. Multiple items in the receipt are used to create a "split" transaction with proper customizable categories added. Further, the software also allows for record keeping, budgeting and budget balancing.

15 Claims, 4 Drawing Sheets

Block Diagram of the Apparatus Hardware

U.S. PATENT DOCUMENTS

| Patent No. | | Date | Inventor | Class |
|---|---|---|---|---|
| 6,246,778 | B1 * | 6/2001 | Moore | 382/103 |
| 6,260,490 | B1 * | 7/2001 | Wark et al. | 110/101 R |
| 6,367,013 | B1 | 4/2002 | Bisbee et al. | |
| 6,397,194 | B1 | 5/2002 | Houvener et al. | |
| 6,427,032 | B1 | 7/2002 | Irons et al. | |
| 6,459,506 | B1 * | 10/2002 | Hu et al. | 358/473 |
| 6,462,842 | B1 * | 10/2002 | Hamilton | 358/486 |
| 6,473,811 | B1 * | 10/2002 | Onsen | 710/15 |
| 6,533,168 | B1 * | 3/2003 | Ching | 235/375 |
| 6,674,924 | B2 | 1/2004 | Wright et al. | |
| 6,676,016 | B1 * | 1/2004 | Coskrey, IV | 235/380 |
| 6,745,186 | B1 | 6/2004 | Testa et al. | |
| 6,760,490 | B1 * | 7/2004 | Zlotnick | 382/311 |
| 6,934,691 | B1 | 8/2005 | Simpson et al. | |
| 7,155,404 | B1 * | 12/2006 | Johnson et al. | 705/19 |
| 7,636,365 | B2 * | 12/2009 | Chang et al. | 370/401 |
| 2002/0019808 | A1 | 2/2002 | Sharma | |
| 2002/0062292 | A1 * | 5/2002 | Iwaguchi et al. | 705/64 |
| 2002/0123949 | A1 | 9/2002 | VanLeeuwen | |
| 2007/0076245 | A1 * | 4/2007 | Sugimoto et al. | 358/1.15 |

* cited by examiner

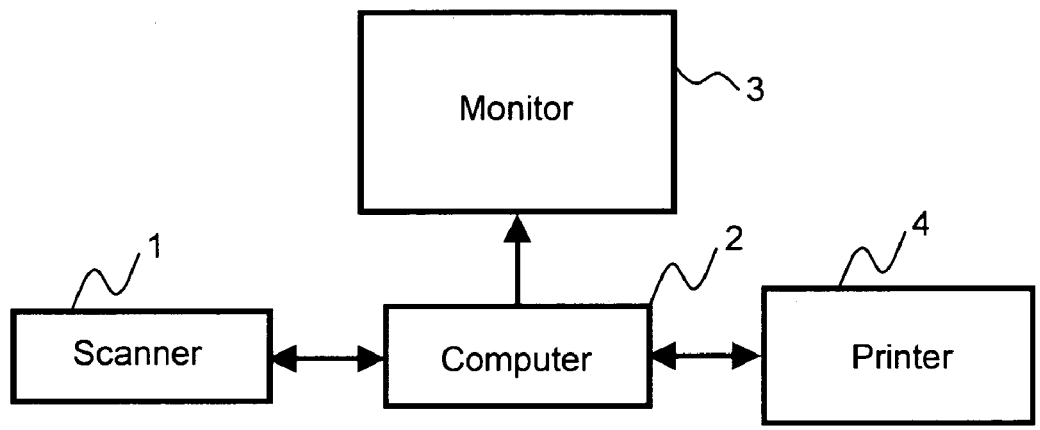
FIG. 1 Block Diagram of the Apparatus Hardware
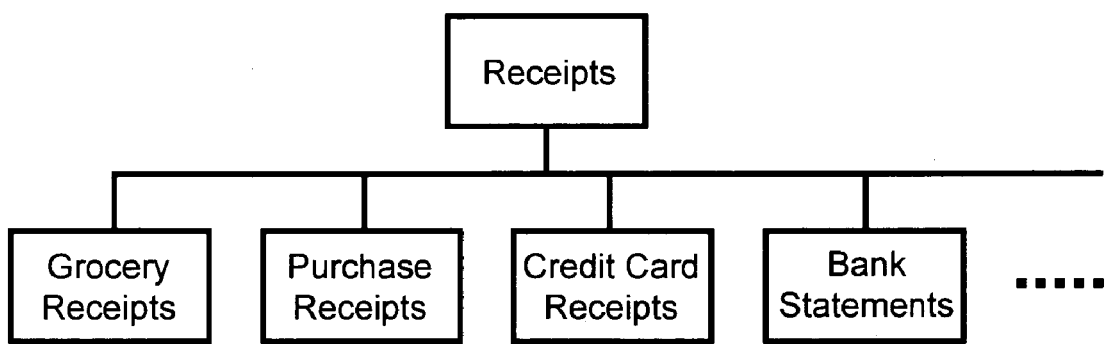
FIG. 3 Various Forms of Scanned Receipts

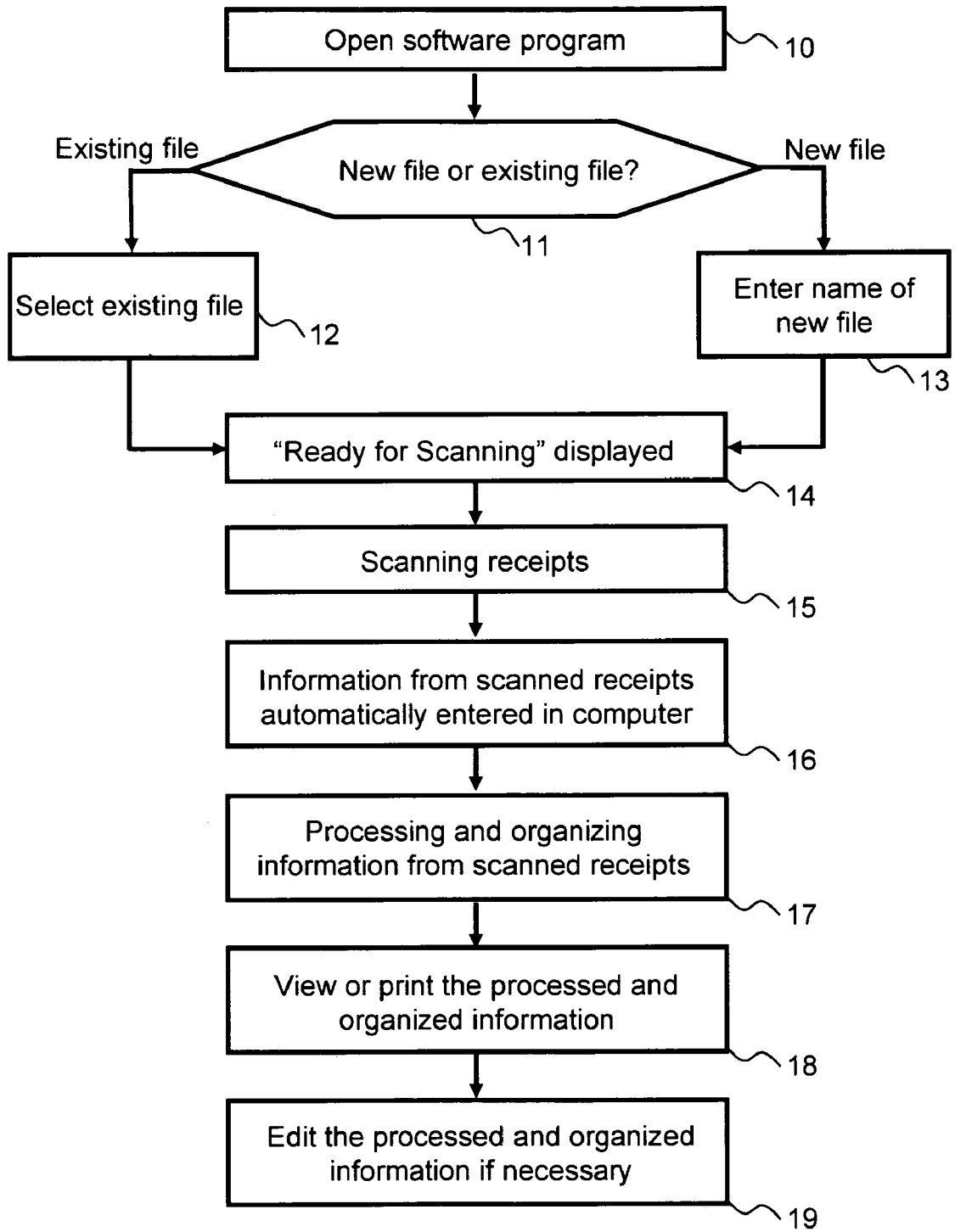
FIG. 2 Flow Chart of the Working of the Apparatus

| Date | Description | Amount |
|---|---|---|
| January 2006 | Grocery | |
| | --Milk 1g | $3.99 |
| | --Coffee Powder 11 oz | $5.99 |
| | --Sugar 5 lbs | $2.99 |
| | --Rice 5 lbs | $2.49 |
| | --Aqua Fresh 6 oz | $1.99 |
| | --Bounty 165 ct | $2.39 |
| | --Potato - wht 5 lbs | $1.99 |
| | --Diet Sprite | $5.99 |
| | | |
| | | |
| | Toiletry | |
| | --Face Cream | $6.59 |
| | --Face Soaps | $8.99 |
| | --Eyeliner | $4.99 |
| | --Nivea WC Face 1.7Z | $11.99 |
| | --Shout 150 oz | $7.99 |
| | --Bounce 160 ct | $5.99 |
| | | |
| | | |
| | Others | |
| | --Ritz 1 hour process | $12.09 |
| | --6' x 9' Rug | $159.00 |
| | | |
| | | |

FIG. 4A An Example of Tabular Form of Organized Information

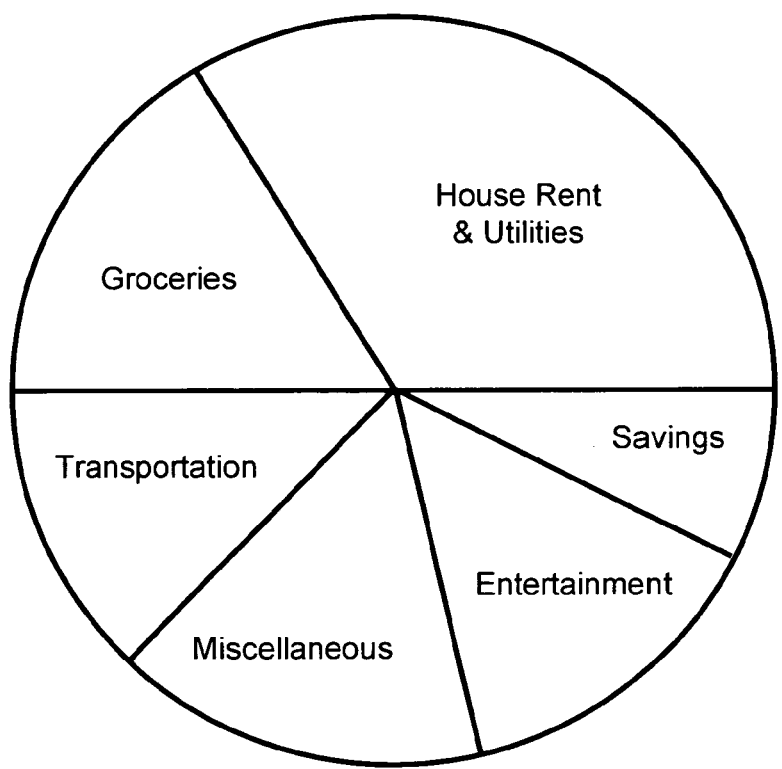
FIG. 4B An Example of Pie-chart Form of Organized Information

RECEIPTS SCANNER AND FINANCIAL ORGANIZER

CROSS REFERENCE TO RELATED APPLICATIONS

This application claims the benefit of U.S. Provisional Patent Application No. 60/265,406, filed on Feb. 1, 2001.

BACKGROUND OF THE INVENTION

1. Field of the Invention

This invention relates to a scanner apparatus to scan receipts into a computer and a software program which automatically organizes all the information that can be viewed in various formats, namely, tabular statements, pie-charts, etc., and allows for record keeping, budgeting and reconciliation.

2. Description of the Related Art

Almost everybody might have wondered at one time or other about where his/her salary is going. Many people think "Although I make more than enough money, I do not know how I am spending it".

You might have attempted to keep track of how you were spending by saving all the receipts, checks, bills and notes about cash transactions, etc. You patiently entered all the receipts into the computer (namely into one of the budgeting or finance managing software programs). This is very laborious and time consuming and after a while you will loose patience and stop entering the data. There ends the plan to know where your salary is going.

Now, with this invention, you can stop wasting your time typing. Simply take your file of receipts and feed them into the scanner. Within seconds after scanning the receipts, the software organizes all the information into a file on your computer that can be viewed in various formats. It's fast, easy, and convenient. Once the receipts are scanned into your computer, you can use the software to manage your expense information.

A thorough patent search resulted in the following related patents but none of them has proposed so far the idea proposed in this invention. For example, the U.S. Pat. No. 6,240,216 entitled "Method and apparatus for processing an image, storage medium for storing an image processing program" relates to an image method and more particularly to mask processing (noise reduction, smoothing of a pattern or the like) of binary image data by software.

There are a number of different kinds of scanners commercially available and some of these have been patented. However, none of them are of the type described in this invention. When a receipt is fed or inserted the scanner of this invention automatically grabs and moves the receipt while it is being scanned and stops at the completion of the scanning of the bill. In addition, the data is automatically captured and organized into a database which allows the data scanned to be viewable in a number of predefined formats which also can be customized if desired.

The prior art references describe excellent applicability to various purposes other than the purpose the present invention is intended. For instance, the U.S. Pat. No. 5,604,640 entitled "Business card scanner and method of use" relates, in general, to optoelectronic devices and, in particular, to scanning mixed media information cards, storing the information, and displaying the scanned information in a variety of display formats. However, feeding and scanning of receipts and having associated software program to organize the data is not dealt with.

The U.S. Pat. No. 5,644,663 entitled "Portable image scanner having manual or automatic feed" relates to an image scanner for automatically scanning a document to optically read out and output image data that is on the document to an image processing device such as a computer, and more particularly to a portable image scanner capable of selectively uniting a cover member to a scanner body to feed a cut-sheet document to be scanned, or detaching the cover member from the scanner body to move the independent scanner body on a thick document such as a book.

The U.S. Pat. No. 6,115,241 entitled "Attachment of a mobile scanner to a portable computer" generally relates to a portable scanning system and more particularly to a versatile attachment of a mobile scanner to a portable computer.

The U.S. Pat. No. 5,897,625 entitled "Automated document cashing system" relates to automated banking systems and machines including those which employ or are an improvement on automatic teller machines (ATMs). These systems perform the usual ATM functions and additionally cash money orders and checks for the user without the presence or the assistance of a teller, allow the depositing of cash into the machine and provide additional functions, such as transferring money by wire, depositing cash into an account or purchasing end user items from the machine.

The U.S. Pat. No. 5,920,877 entitled "Text acquisition and organizing system" relates to apparatus for acquiring and manipulating text and, more particularly, to apparatus for acquiring discrete text strings and automatically formatting those text strings, as they are received, into a preselected data format structure. There are a number of situations in which a researcher or reader may desire to record and organize printed or displayed text included in an existing work for future reference or for some other future use. As used herein, the term "text" is meant to encompass information that is intended for presentation for human comprehension and may comprise symbols, phrases, sentences in natural or artificial language, pictures, diagrams, and tables.

There has not been proposed so far a configuration consisting of a scanner and a software program in order to achieve the purpose described by the present patent application. Thus, none of the prior art references proposed the idea of this invention.

SUMMARY OF THE INVENTION

Briefly stated, the invention is an apparatus to scan receipts with a software which automatically processes, organizes and saves all the information from the scanned receipts. The invention includes a scanner that is connected to a computer through a Universal Serial Bus (USB) port or parallel port and a software program loaded into the computer. As the receipts are being scanned, all the information from the scanned receipts is automatically entered into the computer. A user needs to insert one receipt at a time into this scanner. The receipts can be grocery receipts, various purchase receipts, credit card receipts, bank statements, etc. The invention automatically collects all the data from the receipts the user has scanned, and processes and organizes all the information. The software categorizes each transaction, so you have instant insight into your expenses. You always know exactly where your money goes. The invention creates reports including Income-Expense, Cash Flow, Budget, etc. The invention instantly lets you customize, sort, and subtotal report information on-screen, and shows where any amount in a report comes from. The invention shows a clear picture of your expenses with a number of instant graphs. The organized data can also be viewed in tabular form or pie-chart form, etc. The apparatus allows editing the information from the scanned receipts. The apparatus also automatically saves the information scanned from the receipts in the Quicken Interchange Format (QIF), allowing it to be imported by any financial management program like Quicken, Money, etc. Each scanned receipt will be turned into an individual transaction. The multiple items in the receipt will be used to create a "split" transaction with proper customizable categories. The software loaded into the computer allows for record keeping, budgeting and reconciliation.

For example, making a budget is easy but adhering/implementing it is difficult, but not when you use the system of this invention. Software enables you to create a budget. Once you start scanning the receipts, it lets you know at any time where you stand with respect to your budget, whether you kept up or you need adjustment. A budget lets you set a goal for the amount of money you want to spend in a particular category—for example, $100 per month for entertainment. Then you can run a monthly budget report to compare the budgeted amount to the actual amount that you spent.

The software allows the data from the receipts to be presented in various formats. For example, a list of all the items you have purchased; another list of items you bought from a particular department store; how many times you visited a particular restaurant and how much you spent each time; how much you spent for clothes versus food versus eating outside, etc.

Thus, the software is a simple-to-use financial organizer where all receipt information gets organized into an easily useable format. The software has lots of features to make your life easier. It allows you to find any expense. You can also add notes to the transactions. The semi-processed data can be imported into one of your already existing or familiar programs like Quicken, Money, etc.

Other and further features of this invention will become obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

An embodiment of the present invention will be described hereinafter with reference to the accompanying drawing, in which:

FIG. 1: is a schematic block diagram illustrating the overall arrangement of the scanner and the computer with associated monitor, printer, etc. This overall arrangement is a representative embodiment of the present invention.

FIG. 2: is flow chart of the working of the apparatus.

FIG. 3: is an illustration of various forms of scanned receipts.

FIG. 4A: is an example of Tabular form of Organized Information.

FIG. 4B: is an example of Pie-Chart form of Organized Information.

DETAILED DESCRIPTION OF THE PREFERRED EMBODIMENT

The system, as illustrated in FIG. 1, contains the scanner 1 and the software. The scanner 1 is different from conventional large size scanners you might have seen in some offices or in copying shops. It is a small, light-weight and portable one, and has cables that connect to power outlet for its power and to a computer 2 for communicating back and forth with it. It is capable of scanning receipts of different widths and thicknesses; it has a built-in feeder that takes in receipts as they are fed, similar to a fax machine where the fax page is swept in.

FIG. 2 presents a flow chart of the working of the apparatus as explained in detail below.

The scanner 1 is connected to a computer 2 using a USB port as illustrated in FIG. 1. Before scanning, the user turns on the scanner 1 and the computer 2. Open the software program by clicking on the icon displayed on the screen (see the monitor 3 in FIG. 1) (Step 10). When the program is loaded into the computer 2 it automatically creates an icon on the screen (see the monitor 3 in FIG. 1). The software opens a window displaying two options (Step 11), to open an existing file (Step 12) or to open a new file. In the case of a new file, it allows you to select the name of the new file by typing it in (Step 13). Once a file is selected, it displays "ready for scanning" (Step 14) Now you can feed the receipts into the scanner 1 one at a time (Step 15). Click "scanning complete" once you have finished scanning all the receipts. You will find that all the information from the scanned receipts is automatically entered into the computer 2 (Step 16). Each receipt is entered as a separate transaction using preselected, or default categories. You have the flexibility to change the categories any time and reconcile. Now the software program in the computer 2 has organized all the information (Step 17). This new or updated file is ready for viewing on the screen (see the monitor 3 in FIG. 1) and/or for printing (see the printer 4 in the FIG. 1) (Step 18). Also, after viewing the file, if needed you can modify or edit each transaction (Step 19). Further, the software also allows for record keeping, budgeting and reconciliation.

Thus, the system "Receipts Scanner and Financial Organizer" is an apparatus to scan receipts and a software to automatically process, organize and save all the information from the scanned receipts; it is connected to a computer 2 through a USB port and a software program loaded into the computer. When receipts are fed into the scanner, the invention automatically enters all the information into the computer 2 that is connected to the scanner instead of manually typing the information in. As receipts are scanned, all the information from the receipts is automatically entered into computer 2; a software program operating within the computer 2 processes all the information from the scanned receipts and organizes it. FIG. 3 illustrates various forms of scanned receipts. The invention allows editing of the information from the scanned receipts and organized data. This organized data can be viewed in various formats, namely, tabular form (see FIG. 4A), pie-chart form (see FIG. 4B), etc. The tabular data formats include income-expense reports, planned versus actual budget, list of all expenses with different categories, etc. The invention further processes the data and enables comparison with pre-customized budgets or limits in each category.

The invention also allows QIF formatted data to be imported into any financial organizer program like Quicken, Money, etc.

Possible Extensions

The invention even comes up with suggestions and recommendations using its large up-to-date data base, namely, how you can save on groceries, how you can improve your health habits, how you can save on insurance, how you can save on travel, compares expenses each month with the previous month, prompts you when certain payments might have to be made, projects certain future expenses using data it has compiled (like birth days, marriage days, etc), how you can maintain budget by changing where you buy or what brand name item you buy, gathers information for taxes (keeps track of items that go into tax preparations), etc.

The invention claimed is:

1. An apparatus which manages and organizes expense information, comprising:
   a scanner to scan various types of receipts, each said receipt containing expense information printed thereon, said scanner scanning each said receipt to obtain scanned information for each receipt; and
   a computer in communication with the scanner, said computer executing a software which receives said scanned information for each receipt and which processes the scanned information including numerical data in the receipt to obtain said expense information from said scanned information,
   wherein said expense information for each receipt is categorized into one or more predetermined categories to obtain categorized information for each receipt,
   wherein said categorized information for each receipt is combined with categorized information for other said receipts to produce and display report information for one or more of said predetermined categories;
   wherein the apparatus is configured to process receipts of no predefined format that include grocery receipts, purchase receipts, credit card receipts or bank statements having different widths and thicknesses.

2. An apparatus as claimed in claim 1, wherein the scanner is connected to said computer through a USB port or a pass through parallel port, and wherein the software is stored in the computer.

3. An apparatus as claimed in claim 1, wherein as the receipts are being scanned, the scanned information from the scanned receipts is automatically received by the computer and the expense information for each receipt is captured from the scanned information for each receipt, and categorized into one or more of said predetermined categories.

4. An apparatus as claimed in claim 1, further including a display device in communication with said computer, wherein the report information is displayed on said display device in a tabular form, a pie-chart form, or as a text file.

5. An apparatus as claimed in claim 4, wherein formats of the report information displayed in tabular form include income-expense reports, expenses versus planned budget, cash flow, or a list of all expenses grouped under said one or more predetermined categories.

6. An apparatus as claimed in claim 1, wherein the apparatus allows a user to edit the expense information obtained from each of the scanned receipts.

7. An apparatus as claimed in claim 1, wherein the apparatus is configured to save the expense information processed from the scanned receipts in Quicken Interchange Format, thereby allowing the expense information obtained from the scanned information to be imported by a financial management program.

8. An apparatus as claimed in claim 1, wherein the software allows for record keeping, budgeting and for balancing a budget by displaying tabular data to enable comparison with pre-customized budgets or limits in each said one or more predetermined category.

9. An apparatus as claimed in claim 1, wherein each scanned receipt is organized as an individual transaction so that the expense information obtained from the scanned information for each scanned receipt is able be individually viewed and edited.

10. An apparatus as claimed in claim 9, wherein multiple items in the receipt are used to create a split transaction having the categorized information categorized into customizable categories.

11. An apparatus for managing financial information, comprising:
    a scanner for scanning various types of receipts of no predefined format, each said receipt containing expense information printed thereon;
    a computer in communication with said scanner, said computer receiving a scan of each said receipt, and processing said scan by collecting the expense information from the scan; and
    a display device in communication with said computer, wherein said computer organizes said expense information collected from each said scan by categorizing the expense information into one or more predetermined expense categories to obtain report information,
    wherein said report information for at least one of said predetermined categories is displayed on said display device.

12. An apparatus as claimed in claim 11, wherein said scanner is a portable scanner configured to automatically feed the receipt through said scanner while the receipt is being scanned, said receipts of no predefined format including grocery receipts, purchase receipts, credit card receipts or bank statements having different widths and thicknesses.

13. An apparatus as claimed in claim 11, wherein the apparatus allows a user to edit the expense information collected from the scans of each of said receipts.

14. An apparatus as claimed in claim 11, wherein the apparatus is configured to save the expense information collected from the scans of said receipts in Quicken Interchange Format, thereby enabling the expense information collected from the scans to be imported by a financial management program.

15. An apparatus as claimed in claim 11, wherein each scan of said receipts is organized as an individual transaction so that the expense information obtained from each scanned receipt is able be individually viewed and edited.

* * * * *